US012681498B2

(12) United States Patent
Higa et al.

(10) Patent No.: US 12,681,498 B2
(45) Date of Patent: Jul. 14, 2026

(54) PATHFINDING APPARATUS, PATHFINDING METHOD, AND NON-TRANSITORY COMPUTER-READABLE STORAGE MEDIUM

(71) Applicants: NEC Corporation, Tokyo (JP); NATIONAL INSTITUTE OF ADVANCED INDUSTRIAL SCIENCE AND TECHNOLOGY, Tokyo (JP)

(72) Inventors: Ryota Higa, Tokyo (JP); Shinji Nakadai, Tokyo (JP); Ken Hitsu, Tokyo (JP)

(73) Assignees: NEC CORPORATION, Tokyo (JP); National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 18/720,936

(22) PCT Filed: Dec. 13, 2022

(86) PCT No.: PCT/JP2022/045776
§ 371 (c)(1),
(2) Date: Jun. 17, 2024

(87) PCT Pub. No.: WO2023/136020
PCT Pub. Date: Jul. 20, 2023

(65) Prior Publication Data
US 2025/0053179 A1 Feb. 13, 2025

(30) Foreign Application Priority Data

Jan. 13, 2022 (JP) ................................. 2022-003872

(51) Int. Cl.
*G05D 1/633* (2024.01)
*G05D 1/246* (2024.01)
*G05D 1/698* (2024.01)

(52) U.S. Cl.
CPC ............. *G05D 1/633* (2024.01); *G05D 1/246* (2024.01); *G05D 1/6987* (2024.01)

(58) Field of Classification Search
None
See application file for complete search history.

(56) References Cited

U.S. PATENT DOCUMENTS 12,374,125 B1 * 7/2025 Funke .................. G05D 1/0088
2017/0241790 A1 8/2017 Yoshikawa
(Continued)

FOREIGN PATENT DOCUMENTS

| CA | 3166388 A1 * | 8/2021 | ............. G06N 3/088 |
| CN | 110427261 A * | 11/2019 | ........... G06F 9/4843 |
| JP | 2009-205652 A | 9/2009 | |

OTHER PUBLICATIONS

Sharon et al., "Conflict-based search for optimal multi-agent pathfinding" (Year: 2014).*
(Continued)

*Primary Examiner* — Amelia Vorce
(74) *Attorney, Agent, or Firm* — Sughrue Mion, PLLC

(57) ABSTRACT

A pathfinding apparatus acquires vehicle information, map information, obstacle information. The vehicle information includes a current location and a goal location for multiple vehicles. The map information includes a map of a target space. The obstacle information includes history of locations of one or more moving obstacles. The pathfinding apparatus generates one or more obstacle path for each moving obstacle during a target time window, and generates multiple candidate path sets each of which includes a vehicle path during the target time window for each vehicle. The vehicle (Continued)

path is conflict-free with the other vehicle paths and the obstacle paths. The pathfinding apparatus evaluates the candidate path sets through a heuristic search of continuations of the vehicles paths in the candidate path sets, selects one of the candidate path sets based their evaluations, and outputs the selected candidate path set.

15 Claims, 7 Drawing Sheets

(56)        References Cited

U.S. PATENT DOCUMENTS

| | | | | |
|---|---|---|---|---|
| 2018/0089563 | A1* | 3/2018 | Redding | G06N 5/01 |
| 2019/0094866 | A1 | 3/2019 | Moore et al. | |
| 2020/0198140 | A1* | 6/2020 | Dupuis | G01C 21/20 |
| 2020/0309561 | A1 | 10/2020 | Li et al. | |
| 2021/0149404 | A1* | 5/2021 | Zeng | G01S 17/89 |
| 2021/0286373 | A1 | 9/2021 | Aisu et al. | |
| 2021/0342715 | A1* | 11/2021 | Palmieri | G05D 1/633 |
| 2022/0289179 | A1* | 9/2022 | Thomas | B60W 60/0027 |
| 2022/0301440 | A1* | 9/2022 | Reagan | G05D 1/633 |
| 2022/0402485 | A1* | 12/2022 | Kobilarov | B60W 60/00274 |
| 2023/0073326 | A1* | 3/2023 | Schrittwieser | G06F 18/214 |
| 2023/0179512 | A1* | 6/2023 | Drusinsky | H04L 45/24 |
| | | | | 709/238 |
| 2023/0202470 | A1* | 6/2023 | Lepird | B60W 30/0956 |
| | | | | 701/67 |
| 2024/0004401 | A1* | 1/2024 | Fukunaga | G01C 21/34 |
| 2024/0061431 | A1* | 2/2024 | Matsumura | G05D 1/0214 |
| 2024/0231387 | A1* | 7/2024 | Taniguchi | G05D 1/2465 |
| 2025/0012581 | A1* | 1/2025 | Fukunaga | G05D 1/02 |
| 2025/0076892 | A1* | 3/2025 | Kikkawa | G05D 1/644 |
| 2025/0128419 | A1* | 4/2025 | Lai | B25J 9/1666 |
| 2025/0244776 | A1* | 7/2025 | Kita | G05D 1/6987 |

OTHER PUBLICATIONS

Roni Stern et al. "Multi-Agent Pathfinding: Definitions, Variants, and Benchmarks", [online], Jun. 19, 2019, [retrieved on Dec. 24, 2021], retrieved from <arXiv, https://arxiv.org/pdf/1906.08291. pdf>, pp. 1-8.

Guni Sharon et al., "Conflict-based search for optimal multi-agent pathfinding", Elsevier, Artificial Intelligence, Feb. 2015, pp. 40-66, vol. 219.

International Search Report for PCT/JP2022/045776 dated Feb. 28, 2023.

Written Opinion for PCT/JP2022/045776 dated Feb. 28, 2023.

* cited by examiner

1

PATHFINDING APPARATUS, PATHFINDING METHOD, AND NON-TRANSITORY COMPUTER-READABLE STORAGE MEDIUM

CROSS REFERENCE TO RELATED APPLICATIONS

This application is a National Stage of International Application No. PCT/JP2022/045776 filed Dec. 13, 2022, claiming priority based on Japanese Patent Application No. 2022-003872 filed Jan. 13, 2022.

TECHNICAL FIELD

The present disclosure generally relates to pathfinding problems with multiple vehicles.

BACKGROUND ART

Techniques related to pathfinding problems with multiple vehicles, called Multi-Agent Pathfinding (MAPF) problem, have been developed. NPL1 discloses various algorithms to solve MAPF problems.

CITATION LIST

Non Patent Literature

NPL1: Roni Stern, Nathan Sturtevant, Ariel Felner, Sven Koenig, Hang Ma, Thayne Walker, Jiaoyang Li, Dor Atzmon, Liron Cohen, T. K. Satish Kumar, Eli Boyarski, and Roman Bartak, "Multi-Agent Pathfinding: Definitions, Variants, and Benchmarks", [online], Jun. 19, 2019, [retrieved on 2021 Dec. 24], retrieved from <arXiv, https://arxiv.org/pdf/1906.08291.pdf>

NPL2: Guni Sharon, Roni Stern, Ariel Felner, and Nathan R. Sturtevant, "Conflict-based search for optimal multi-agent pathfinding", Elsevier, Artificial Intelligence, Volume 219, Pages 40-66, February 2015

SUMMARY OF INVENTION

Technical Problem

NPL1 discloses no algorithm that can handle uncontrollable moving obstacles, such as human. The present disclosure provides a novel technique to find a set of paths for multiple vehicles under a situation where one or more uncontrollable moving obstacles exist.

Solution to Problem

The present disclosure provides a pathfinding apparatus comprises at least one processor and memory storing instructions. The at least one processor is configured to execute the instructions to: acquire vehicle information, obstacle information, and map information, the vehicle information including a current location and a goal location for each of multiple vehicles, the obstacle information including history of locations of one or more moving obstacles, the map information including a map of a space in which the vehicles and the moving obstacles travel; generate one or more obstacle paths for each moving obstacle during a target time window of a predefined length based on the obstacle information and the map information; generate multiple candidate path sets based on the vehicle information, the obstacle paths, and the map information, the candidate path set including a vehicle path during the target time window for each vehicle, the vehicle path being conflict-free with the other vehicle paths and the obstacle paths; evaluate the candidate path sets through a heuristic search of continuations of the vehicles paths in the candidate path sets; and select one of the candidate path sets based their evaluations to output the selected candidate path set.

The present disclosure provides a path finding method performed by a computer. The path finding method comprises: acquiring vehicle information, obstacle information, and map information, the vehicle information including a current location and a goal location for each of multiple vehicles, the obstacle information including history of locations of one or more moving obstacles, the map information including a map of a space in which the vehicles and the moving obstacles travel; generating one or more obstacle paths for each moving obstacle during a target time window of a predefined length based on the obstacle information and the map information; generating multiple candidate path sets based on the vehicle information, the obstacle paths, and the map information, the candidate path set including a vehicle path during the target time window for each vehicle, the vehicle path being conflict-free with the other vehicle paths and the obstacle paths; evaluate the candidate path sets through a heuristic search of continuations of the vehicles paths in the candidate path sets; and selecting one of the candidate path sets based their evaluations to output the selected candidate path set.

The present disclosure provides a non-transitory computer-readable storage medium storing a program that causes a computer to execute: acquiring vehicle information, obstacle information, and map information, the vehicle information including a current location and a goal location for each of multiple vehicles, the obstacle information including history of locations of one or more moving obstacles, the map information including a map of a space in which the vehicles and the moving obstacles travel; generating one or more obstacle paths for each moving obstacle during a target time window of a predefined length based on the obstacle information and the map information; generating multiple candidate path sets based on the vehicle information, the obstacle paths, and the map information, the candidate path set including a vehicle path during the target time window for each vehicle, the vehicle path being conflict-free with the other vehicle paths and the obstacle paths; evaluate the candidate path sets through a heuristic search of continuations of the vehicles paths in the candidate path sets; and selecting one of the candidate path sets based their evaluations to output the selected candidate path set.

Advantageous Effects of Invention

According to the present disclosure, a novel technique to find a set of paths for multiple vehicles under a situation where one or more uncontrollable moving obstacles exist.

DESCRIPTION OF EMBODIMENTS

Example embodiments according to the present disclosure will be described hereinafter with reference to the drawings. The same numeral signs are assigned to the same elements throughout the drawings, and redundant explanations are omitted as necessary. In addition, a storage unit is formed with one or more storage devices.

First Example Embodiment

Overview

Figure 1:
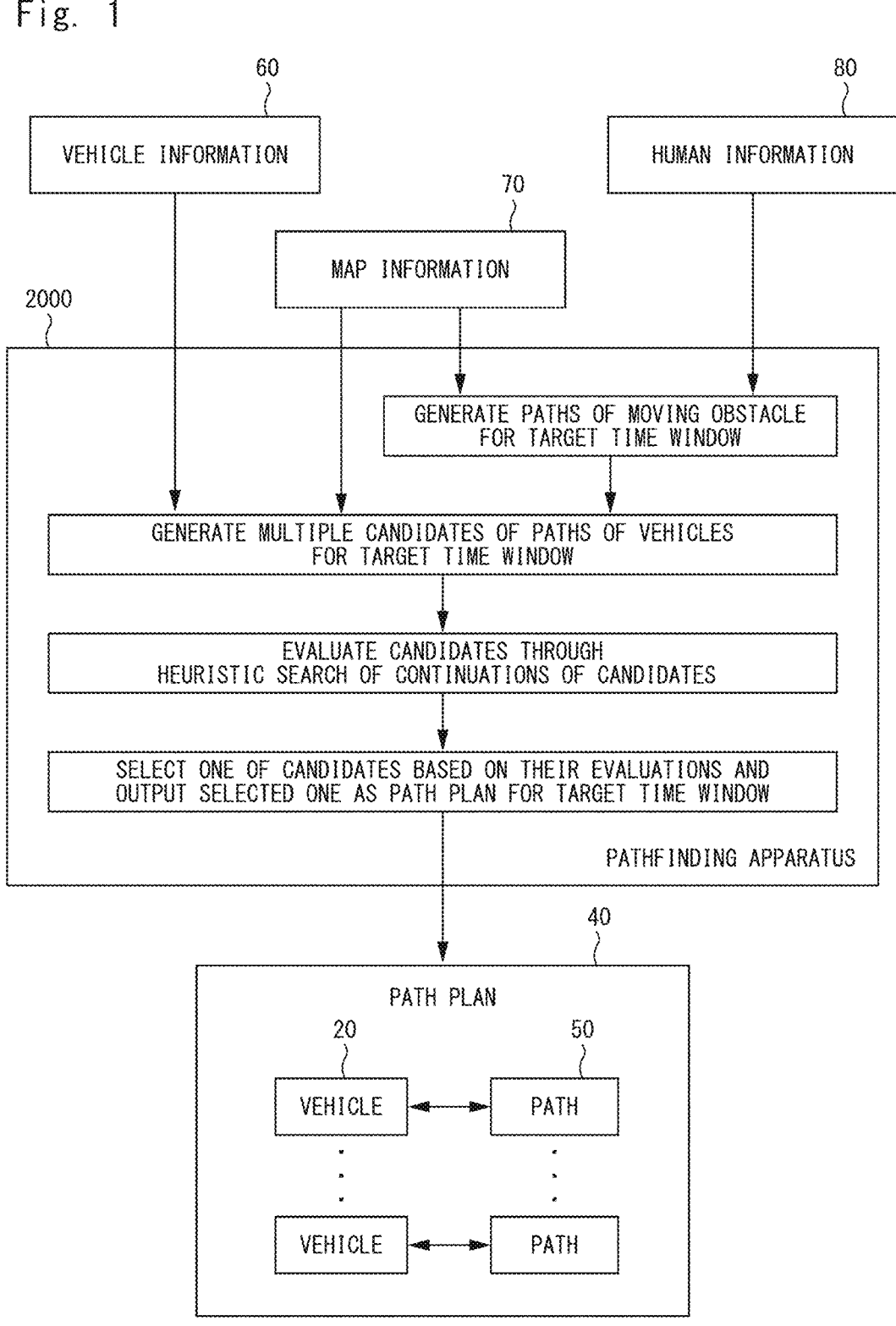
FIG. 1 illustrates an overview of the pathfinding apparatus of the first example embodiment.

FIG. 1 illustrates an overview of the pathfinding apparatus 2000 of the first example embodiment. Note that the overview illustrated by FIG. 1 shows an example of operations of the pathfinding apparatus 2000 to make it easy to understand the pathfinding apparatus 2000, and does not limit or narrow the scope of possible operations of the pathfinding apparatus 2000.

The pathfinding apparatus 2000 operates to generate a path plan 40 for a set of vehicles 20. The path plan 40 is a set of paths 50, and includes the path 50 for each of multiple vehicles 20. The path 50 is a time-series data that indicates a location of the corresponding vehicle 20 for each point in time (hereinafter, point in time is also called "time step"). Each vehicle 20 can be configured to travel from its start location to its goal location in a target space along the corresponding path 50. The start and goal locations are pre-defined for each vehicle 20. The target space is arbitrary place in which the vehicles 20 can travel: e.g., a warehouse or a factory.

The vehicle 20 may be arbitrary moving object that is controllable to travel along an allocated path. In some implementations, the vehicle 20 may be arbitrary type of autonomous vehicle such as an automatic guided vehicle (AGV), a drone, and so on. In other implementations, the vehicle 20 may be arbitrary type of moving object that is manually operated.

To avoid collision between the vehicles 20, the path plan 40 is required to be conflict-free, i.e., each path 50 conflicts with neither one of the other paths 50 in the path plan 40. In addition, it is assumed that not only vehicles 20 but also one or more moving obstacles, such as human, travel in the target space. Thus, to avoid a collision between the vehicle 20 and the moving obstacle, the paths 50 are also required to be conflict-free with the paths of moving obstacles. Hereinafter, for the purpose of the clarification, the path of the vehicle 20 and that of the moving obstacle are called "vehicle path" and "obstacle path", respectively. It is noted that the obstacle path is a path of moving obstacle along which the moving obstacle is predicted to travel.

The moving obstacle is arbitrary moving object that is uncontrollable from the viewpoint of the pathfinding apparatus 2000. For example, the moving obstacle is a moving object that does not move along an allocated path, e.g., human. In another example, the moving obstacle is a moving object that moves along an allocated path that is not open to the pathfinding apparatus 2000.

The pathfinding apparatus 2000 generates the path plan 40 for each of consecutive time windows with a predefined length denoted by WL. The path plan 40 for a target time window is generated on or before the start time of that time window. Hereinafter, the time window for which the pathfinding apparatus 2000 is generating the path plan 40 is called "target time window".

Suppose that the start time of travel of the vehicles 20 are set as 0. In this case, the path plan 40 is generated for each of the first time window W_1 that is from 0 to WL, the second time window W2 that is from WL to 2*WL, . . . , and the n-th time window W_n that is from (n−1)*WL to n*WL. The time window W_n is the last time window in which the last vehicle 20 reaches its goal. Without otherwise stated, the start time of travel of the vehicles 20, i.e., the start time of the first time window W1, is assumed to be set as 0 as describe above.

To generate the path plan 40 for the target time window, the pathfinding apparatus 2000 operates as follows. The pathfinding apparatus 2000 acquires vehicle information 60, map information 70, and obstacle information 80. The vehicle information 60 indicates a current location and a goal location for each vehicle 20. The current location of the vehicle 20 represents the location thereof at the beginning of the target time window (i.e., at the end of the previous time window). When the target time window is the first time window, the current location is equivalent to the start location from which the travel of the vehicle 20 starts. The obstacle information 80 indicates a history of locations for each moving obstacle.

The pathfinding apparatus 2000 predicts actions of each moving obstacle during the target time window using the map information 70 and the obstacle information 80, thereby generating one or more sets of the obstacle paths of the moving obstacles during the target time window. Hereinafter, a set of the obstacle paths is called "obstacle path set".

Then, the pathfinding apparatus 2000 generates multiple candidates of the path plan 40 based on the vehicle information 60, the map information 70, and the obstacle path sets. The candidate of the path plan 40 is a set of the vehicle paths of the vehicles 20 during the target time window. Hereinafter, the candidate of the path plan 40 is called "candidate path set". Each candidate path set is generated to be conflict-free: every vehicle 20 does not collide with the other vehicles 20 or the moving obstacles. In some implementations, a variant of Conflict-based Search (CBS) algorithm is used to generate the multiple candidate path sets.

After generating the multiple candidate path sets, the pathfinding apparatus 2000 evaluates the multiple candidate path sets. The candidate path sets are evaluated through a heuristic search of continuations thereof. In some implementations, Monte Carlo Tree Search (MCTS) algorithm is used for the heuristic search.

The pathfinding apparatus 2000 selects one of the multiple candidate path sets based on their evaluation, and outputs the selected candidate path set as the path plan 40 for the target time window. For example, the candidate path set with the highest evaluation is selected as the path plan 40 for the target time window.

Example of Advantageous Effect

In a real situation, the vehicles such as AGVs may travel in a space where uncontrollable moving obstacles such humans also travel. For the safety of the space, it is preferable to make a path plan for the vehicles so that the vehicles do not collide not only with each other but also with the moving obstacles.

According to the pathfinding apparatus 2000 of the first example embodiment, paths of uncontrollable moving obstacles are predicted based on the history of locations of the moving obstacles. Then, paths of the vehicles 20 are generated taking the paths of the moving obstacles into consideration. Thus, the paths of the vehicles 20 can be generated so as not to conflict not only with each other but also with the paths of the moving obstacles. In the case where the moving obstacle is human, it is possible to provide a safe environment to human who works there.

More specifically, the pathfinding apparatus 2000 generates the multiple candidates of the paths of the vehicles 20 for the target time window, which is a period of time with the predefined length. Then, the multiple candidates are evaluated through a heuristic search (e.g., MCTS) of continuations of those candidates, and one of them is selected as the path plan 40 of the target time window. By this manner, the pathfinding apparatus 2000 can provide a preferable path plan 40 with less computation time.

Specifically, due to unpredictability of the moving object, it takes much computation time to generate one time the path plan 40 that is guaranteed to be conflict-free until all the vehicles 20 reach their goals. On the other hand, although a heuristic search algorithm may generate the path plan 40 with less computation time, the path plan 40 generated only by the heuristic search is not guaranteed to be conflict-free. Regarding these points, since the pathfinding apparatus 2000 generates candidates of the path plan 40 that are guaranteed to be conflict-free during the target time window and then evaluates them through a heuristic search, it can generate a preferable path plan 40 that is guaranteed to be conflict-free with less computation time.

Hereinafter, more detailed explanation of the pathfinding apparatus 2000 of the first example embodiment will be described.

<Example of Functional Configuration>

Figure 2:
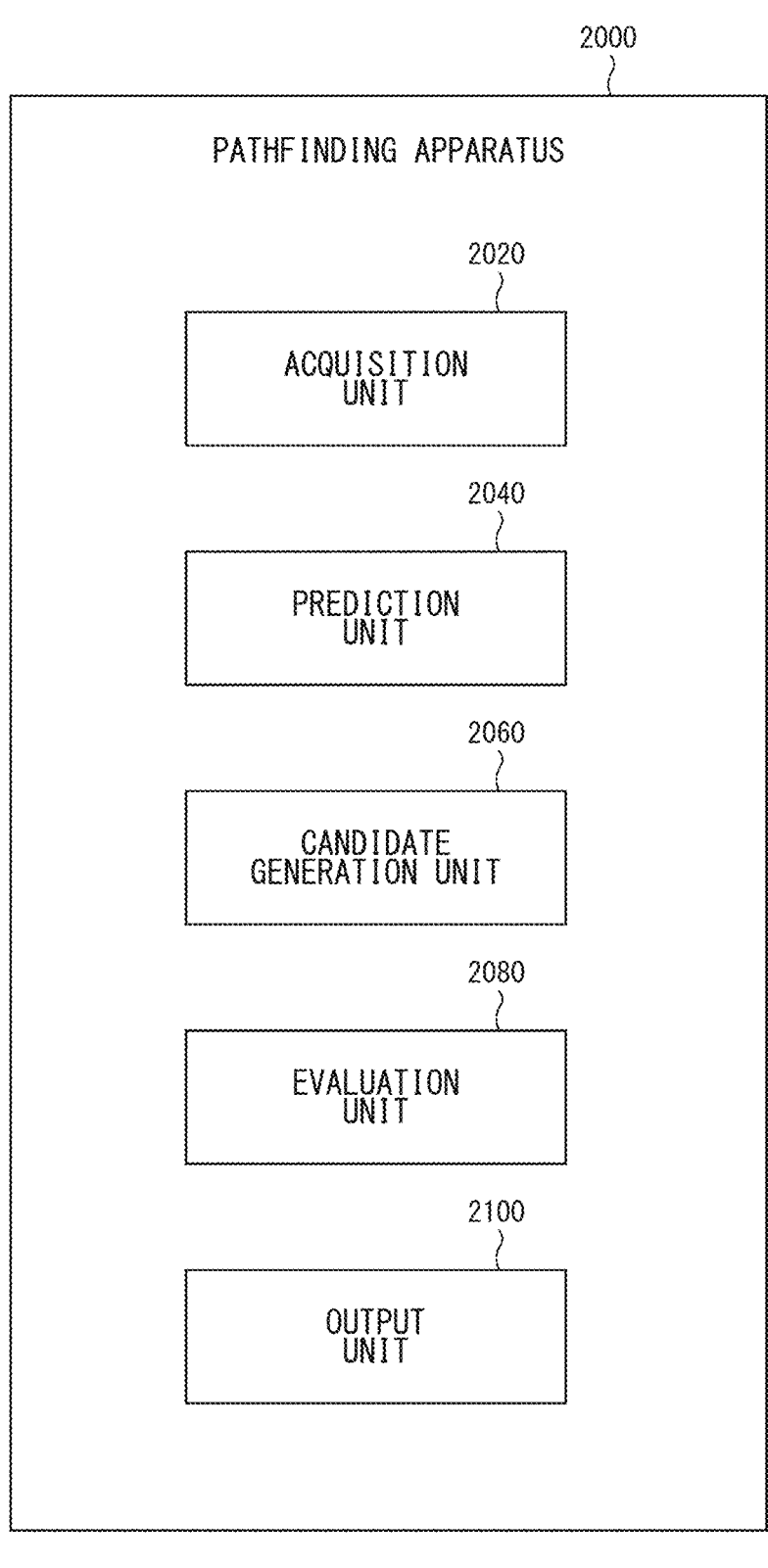
FIG. 2 is a block diagram illustrating an example of a functional configuration of the pathfinding apparatus.

FIG. 2 illustrates an example of a functional configuration of the pathfinding apparatus 2000. The pathfinding apparatus 2000 includes an acquisition unit 2020, a prediction unit 2040, a candidate generation unit 2060, an evaluation unit 2080, and an output unit 2100.

The acquisition unit 2020 acquires the vehicle information 60, the map information 70, and the obstacle information 80. The prediction unit 2040 generates one or more obstacle path sets for the target time window based on the map information 70 and the obstacle information 80. The candidate generation unit 2060 generate the multiple candidate path sets for the target time window based on the vehicle information 60, the map information 70, and the obstacle path sets of target time window. The evaluation unit 2080 evaluates the candidate path sets through a heuristic search of continuations of the candidate path sets. The output unit 2100 selects one of the candidate path sets based on their evaluations and outputs the selected one as the path plan 40 for the target time window.

Example of Hardware Configuration

The pathfinding apparatus 2000 may be realized by one or more computers. Each of the one or more computers may be a special-purpose computer manufactured for implementing the pathfinding apparatus 2000, or may be a general-purpose computer like a personal computer (PC), a server machine, or a mobile device.

The pathfinding apparatus 2000 may be realized by installing an application in the computer. The application is implemented with a program that causes the computer to function as the pathfinding apparatus 2000. In other words, the program is an implementation of the functional units of the pathfinding apparatus 2000.

Figure 3:
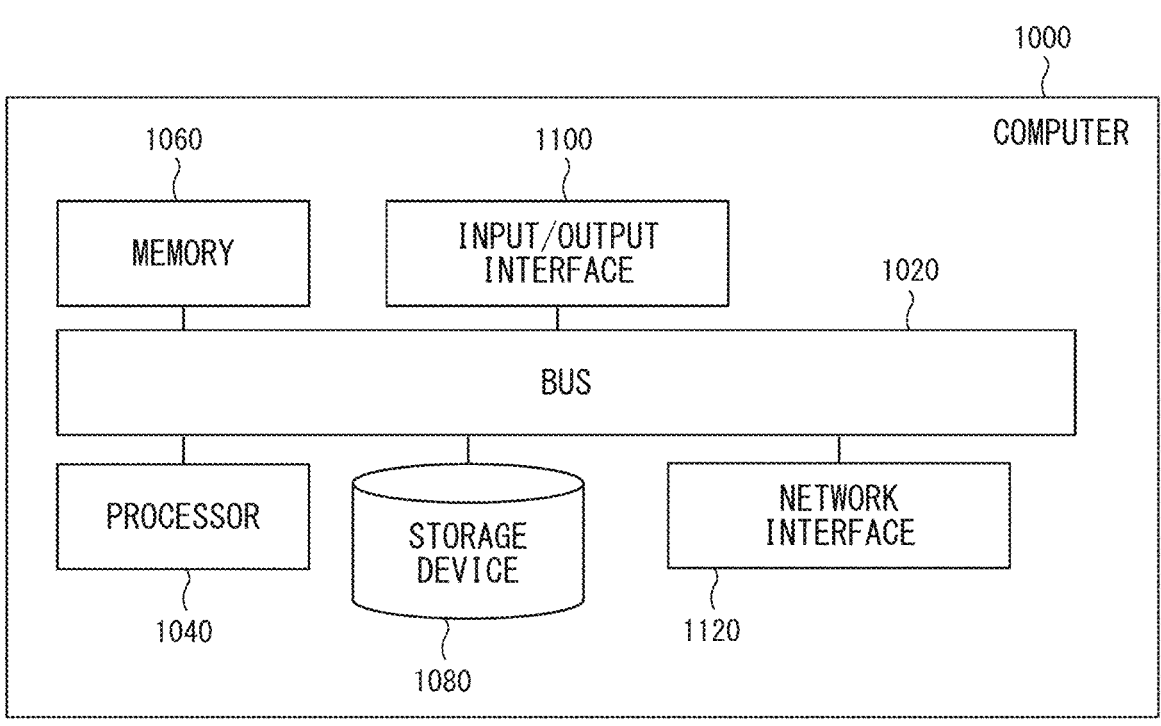
FIG. 3 is a block diagram illustrating an example of the hardware configuration of a computer realizing the pathfinding apparatus.

FIG. 3 is a block diagram illustrating an example of the hardware configuration of a computer 1000 realizing the pathfinding apparatus 2000. In FIG. 3, the computer 1000 includes a bus 1020, a processor 1040, a memory 1060, a storage device 1080, an input/output interface 1100, and a network interface 1120.

The bus 1020 is a data transmission channel in order for the processor 1040, the memory 1060, the storage device 1080, and the input/output interface 1100, and the network interface 1120 to mutually transmit and receive data. The processor 1040 is a processer, such as a CPU (Central Processing Unit), GPU (Graphics Processing Unit), or FPGA (Field-Programmable Gate Array). The memory 1060 is a primary memory component, such as a RAM (Random Access Memory) or a ROM (Read Only Memory). The storage device 1080 is a secondary memory component, such as a hard disk, an SSD (Solid State Drive), or a memory card. The input/output interface 1100 is an interface between the computer 1000 and peripheral devices, such as a keyboard, mouse, or display device. The network interface 1120 is an interface between the computer 1000 and a network. The network may be a LAN (Local Area Network) or a WAN (Wide Area Network).

The storage device 1080 may store the program mentioned above. The CPU 1040 executes the program to realize each functional unit of the pathfinding apparatus 2000.

The hardware configuration of the computer 1000 is not limited to the configuration shown in FIG. 3. For example, as mentioned-above, the pathfinding apparatus 2000 may be realized by plural computers. In this case, those computers may be connected with each other through the network.

<Flow of Process>

Figure 4:
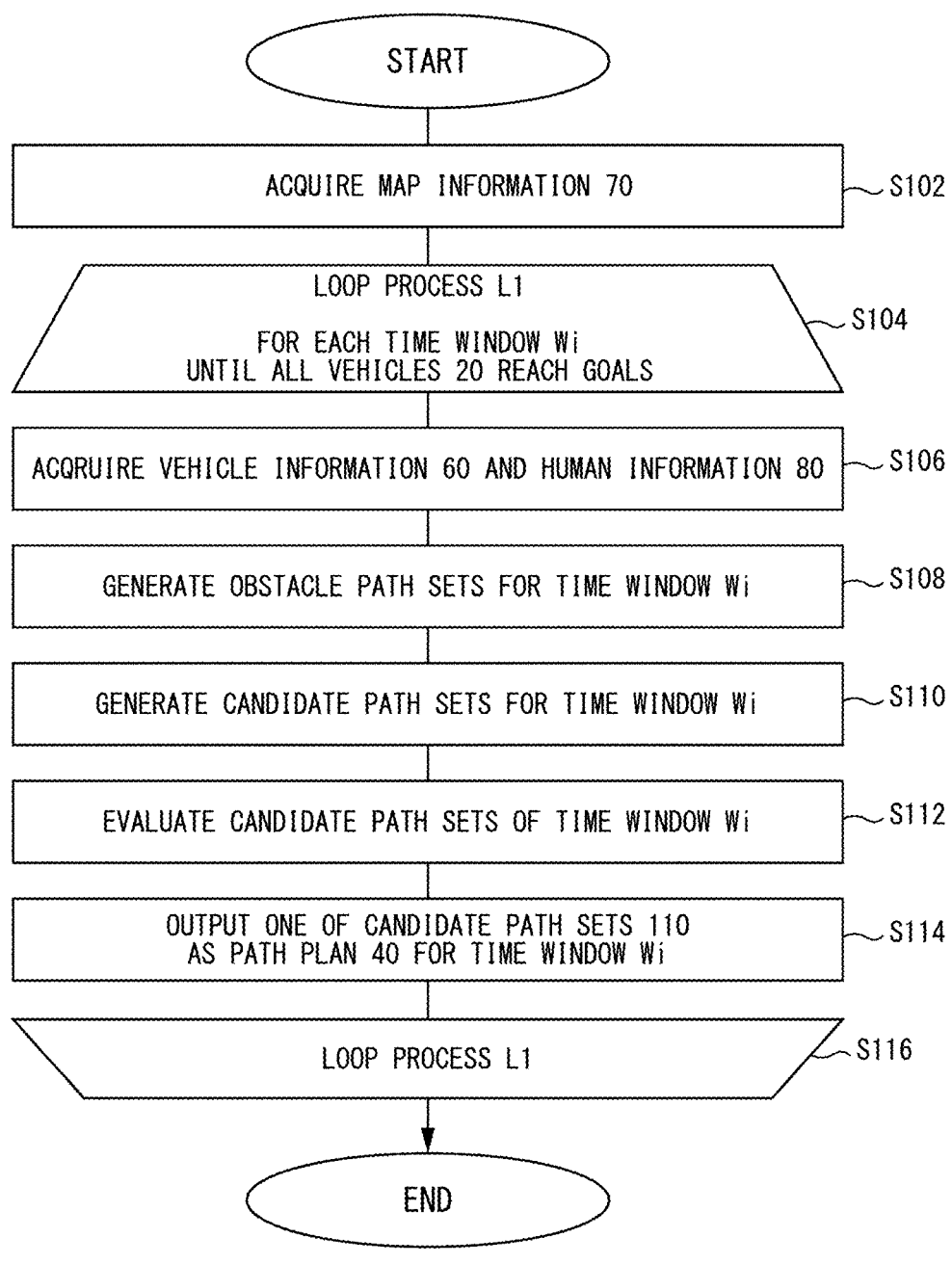
FIG. 4 is a flowchart illustrating an example flow of process performed by the pathfinding apparatus of the first example embodiment.

FIG. 4 is a flowchart illustrating an example of an overall flow of process that is performed by the pathfinding apparatus 2000 of the first example embodiment. It is noted that the flow of process performed by the pathfinding apparatus 2000 is not limited to one shown by FIG. 4.

The acquisition unit 2020 acquires the map information 70 (S102). Steps S104 to S116 forms a loop process L1 that is performed for each time window Wi until all vehicles 20 reach their goals. It is noted that i represents an index of the current iteration of the loop process L1. For each iteration of the loop process L1, the time window Wi is the target time window.

In Step S104, the pathfinding apparatus 2000 determines whether or not all vehicles 20 reach their goals in the path plan 40 of the previous time window. In the case where all vehicles 20 reach their goals in the path plan 40 of the previous time window, the execution of the loop process L1 terminates, and thus the process illustrated by FIG. 4 terminates. On the other hand, in the case where there is one or more vehicles 20 that do not reach their goals in the path plan 40 of the previous time window, the next iteration of the loop process L1 is performed.

The acquisition unit 2020 acquires the vehicle information 60 and the obstacle information 80 (S106). The prediction unit 2040 generates one or more obstacle path sets for the time window Wi (i.e., target time window) based on the map information 70 and the obstacle information 80 (S108). The candidate generation unit 2060 generates multiple candidate path sets for the time window Wi based on the vehicle information 60, the map information 70, and the obstacle path set of the time window Wi (S110). The evaluation unit 2080 evaluates the candidate path sets of the time window Wi through a heuristic search of continuations of the candidate path sets (S112). The output unit 2100 selects one of the candidate path sets based on their evaluations, and outputs the selected one as the path plan 40 of the time window Wi (S114).

Step S116 is the end of the loop process L1. Thus, Step S104 is performed next.

<Acquisition of Map Information 70: S102>

The acquisition unit 2020 acquires the map information 70 (S102). The map information 70 represents a map of the target space. Theoretically, the map may represent a graph G=(V,E) wherein V is a set of vertexes and E is a set of edges. The vertexes represent locations, and the edges represent connections between locations.

There are various ways to implement a map of the target space. In some implementations, the map is implemented as a two-dimensional (2D) or three-dimensional (3D) grid map. In this case, each location is represented by a cell in the grid map. In addition, each connection between locations is represented by a connection between cells in the grid map.

The map information 70 may also indicate a location of each stationary obstacle, such as a wall, shelf, and so on. Each obstacle is defined by one or more locations (e.g., cells of the grid map) that are permanently occupied at least during the travel of the vehicles 20.

There may be various ways to acquire the map information 70. For example, the map information 70 is stored in advance in a storage unit to which the pathfinding apparatus 2000 has access. In this case, the acquisition unit 2020 acquires the map information 70 from the storage unit. In another example, the acquisition unit 2020 may acquire the map information 70 by receiving it that is sent from another computer.

<Acquisition of Vehicle Information 60: S106>

The acquisition unit 2020 acquires the vehicle information 60 (S106). The vehicle information 60 indicates the current location and goal location for each vehicle 20. In the case where the target time window is the first time window W1, the current location of the vehicle 20 is equivalent to the start location thereof from which its travel starts. Other than that case, the current location of the vehicle 20 is equivalent to the last location thereof indicated by the path plan 40 of the previous time window.

It is noted that, since the goal locations of the vehicles 20 are common in all time windows, it is not necessary for the acquisition 2020 to obtain the goal locations from outside of the pathfinding apparatus 2000 in every iteration of the loop process L1 except for the first one. Thus, in some implementations, the acquisition 2020 may cache the goal locations of the vehicle 20 in the pathfinding apparatus 2000 (e.g., in the storage device 1080) in the first iteration of the loop process L1, and obtain from the cache in the other iterations. In this case, the vehicle information 60 is not required to include the goal locations of the vehicles 20 except for the first iteration of the loop process L1.

The acquisition unit 2020 may acquire the vehicle information 60 in a similar manner to that for acquiring the map information 70 mentioned above.

<Acquisition of Obstacle Information 80: S106>

In Step S106, the acquisition unit 2020 also acquires the obstacle information 80. The obstacle information 80 includes the history of locations of the moving obstacles that travel in the target space. The history of locations of the moving obstacle can be represented by a time-series data of locations of the moving obstacle (e.g., pairs of a time step and a location of the moving obstacle).

The obstacle information 80 can be generated by various ways. For example, the obstacle information 80 can be generated by analyzing a video data generated by a camera that is installed to capture the target space. In another example, the obstacle information 80 can be generated by repeatedly obtaining location information from a sensor device (such as a GPS (Global Positioning System) sensor) attached to or held by the moving obstacle. In the case where the moving obstacle is a person, the sensor may be a GPS sensor installed in a mobile device, e.g., smart phone, of that person.

<Generation of Obstacle Path Set: S108>

The prediction unit 2040 generates one or more obstacle path sets for the target time window Wi based on the obstacle information 80 of the target time window and the map information 70 (S108). To generate the obstacle path set, the prediction unit 2040 predicts movements of the moving obstacles during the target time window based on the obstacle information 80.

There are various well-known ways to predict movements of objects based on the history of their locations, and any one of them can be employed to predict the movements of the moving obstacles. In some implementations, the prediction unit 2040 uses a motion simulator (called "obstacle motion simulator", hereinafter) that simulates and predicts motions of objects. The obstacle motion simulator may be a random simulator in which the moving obstacles are supposed to move randomly. Also, other models may be applied in the obstacle motion simulator, such as route-based model or some other rule-based models.

The prediction unit 2040 may invoke the obstacle motion simulator to perform a predefined times of simulations based on the history of locations of the moving obstacles that are indicated by the obstacle information 80 to predict the paths of moving obstacles. Then, for each moving obstacle, the prediction unit 2040 may choose a path with the most visited times as the obstacle paths thereof. A set of the chosen obstacle paths are used as the obstacle path set.

When the prediction unit 2040 generates N obstacle paths for each moving obstacle (N>1), the prediction unit 2040 may choose, for each moving obstacle, the top N paths regarding the visited times as the obstacles paths thereof. Then, the prediction unit 2040 generate the multiple obstacle path sets by combining the obstacle paths of the moving obstacles. At most, the prediction unit 2040 can obtain $N^K$ obstacle path sets when there are K moving obstacles.

<Generation of Candidate Path Set: S110>

The candidate generation unit 2060 generates the multiple candidate path sets for the target time window (S110). The candidate path set of the target time window is a candidate of the path plan 40 for the target time window. The candidate path set includes a vehicle path during the target time window for each vehicle 20. The vehicle paths in the candidate path set are conflict-free with each other. In addition, the vehicle path in the candidate path set is also conflict-free with the obstacle paths in the obstacle path set of the target time window.

In some implementations, the candidate generation unit 2060 performs a deterministic algorithm that can find paths of multiple vehicles that are guaranteed to be conflict-free with each other (in other words, a deterministic algorithm to solve a MAPF problem). There are various deterministic algorithms to generate conflict-free paths for multiple vehicles. For example, the candidate generation unit 2060 may perform a variant of CBS algorithm; the original version of CBS algorithm is disclosed by NPL2. Hereinafter, the original version of CBS is called "original CBS", whereas the variant of CBS that is employed in the path-finding apparatus 2000 is called "variant CBS".

The CBS is a two-level search algorithm, divided into high-level and low-level searches. The high-level search is performed using a binary search tree called "constraint tree (CT)". Each node of CT contains (1) time and location constraints related to the conflicts that are detected by the low-level search performed at its parent node; (2) a single candidate solution (i.e., a candidate set of paths of all vehicles) that satisfies all constraints indicated by that node and its ancestors; and (3) the evaluation of the solution, which is the sum of total paths duration of all vehicles in the original CBS. In the original CBS, the root node of CT contains an empty set of constraints.

The constraint contained in the node indicates which vehicle is prohibited from occupying which location at which time. For example, it is detected that a vehicle A1 and A2 conflicts with each other at the location L1 at time T1. In this case, the constraint that "the vehicle A1 must not occupy the location L1 at time T1" or the constraint that "the vehicle A2 must not occupy the location L1 at time T1" may be employed to avoid the conflict.

For each node of the CT, the low-level search is invoked for a vehicle whose path has to be replanned. In the original CBS, an A* search algorithm is employed as a path planning algorithm to find a new path for the vehicle while satisfying the constraints indicated by the current node and its ancestors. However, the path search algorithm used for the low-level search is not limited to A* search algorithm in the variant CBS.

The variant CBS is different from the original CBS at least in the following three points: (1) constraints based on the obstacle path set are included in the root node of CT; (2) not all conflicts but conflicts during the target time window are to be resolved; and (3) multiple solutions are output. Hereinafter, these points are explained in detail.

<<(1) Constraints Based on Obstacle Path Set>>

In order to avoid conflicts between the vehicle 20 and the moving obstacle, the variant CBS is required to search a set of the paths of the vehicles 20 taking the obstacle path set into consideration. Specifically, the obstacle path of a moving obstacle can be used to generate constraints for avoiding collisions with that moving obstacle. For example, if a moving obstacle is located at a location L1 at time T1, no vehicle 20 is allowed to occupy the location L1 at time T1.

Thus, the candidate generation unit 2060 generates the constraints for avoiding collisions with the moving obstacles based on the obstacle paths included in the obstacle path set of the target time window, and adds the generated constraints to CT of the variant CBS. Since every vehicle 20 has to avoid collisions with the moving obstacles, the constraints for avoiding collisions with the moving obstacles are common in all vehicles 20. Thus, the constraints for avoiding collisions with the moving obstacles are added to the root node of CT.

<<(2) Resolution of Conflicts During Target Time Window>>

The original CBS detects all conflicts happened during a whole travel of all vehicles 20 and add constraints for avoiding the detected conflicts to the nodes of CT. However, the vehicle paths in the candidate path set are not required to conflict-free until all vehicles 20 reach their goal, but required to conflict-free during the target time window.

Thus, the variant CBS detects the conflicts happened during the target time window, and add constraints for avoiding the detected conflicts to the nodes of CT, thereby generating the vehicle paths that are conflict-free at least during the target time window. By not taking the conflicts after the target time window into consideration, the variant CBS can generate the vehicle paths that are conflict-free at least during the target time window with less computation time than the case to generate the vehicles paths that are conflict-free until their end.

<<Output of Multiple Solutions>>

The original CBS outputs a single optimal solution under the assumption that there is no uncontrollable obstacle, such as moving obstacle. On the other hand, the variant CBS is formed to output multiple solutions so as to evaluate the solutions taking uncontrollable obstacles into consideration. Specifically, the variant CBS generates multiple CTs that provide solutions different from each other, thereby providing multiple solutions. At the root node of each CT, the low-level search is invoked to generate an initial set of paths of the vehicles under the restriction that the path of each vehicle must be different from any paths of that vehicles that are generated at the root nodes of the different CTs. It is noted that the constraints based on the obstacle path set are shared with all CTs.

Suppose that the low-level search is invoked at the root node of the i-th CT to generate a path for the vehicle VI. In this case, the vehicle VI is forbidden from visiting any paths of the vehicle VI that are generated at the root nodes of the 1st to (i-1)-th CTs.

The candidate generation unit 2060 converts each of the multiple solutions that are output from of the variant CBS into the candidate path set. The vehicle path of the vehicle 20 in the solution of the variant CBS indicates the locations of the vehicle 20 until the vehicle 20 reaches its goal, whereas the vehicle path of the vehicle 20 in the candidate path set indicates the locations of the vehicle 20 during the target time window. Thus, for each vehicle 20, the candidate generation unit 2060 may remove the locations of the vehicle 20 after the end of the target time window from the vehicle path of the vehicle 20 included in a solution of the variant CBS, to generate the vehicle path of the vehicle that is included in the candidate path set.

<Evaluation of Candidate Path Set: S112>

The evaluation unit 2080 evaluates the candidate path sets through a heuristic search of continuations of the vehicle paths in the candidate path sets. For example, a heuristic search algorithm that is classified into MCTS may be employed to evaluate the candidate path sets.

MCTS has been applied to a game, such as Go or Chess, to solve a problem of "which one of possible actions is to be selected for the next step". For this purpose, MCTS generates a search tree that has a root node and multiple child nodes of the root node. The root node represents the current state. Each edge between the root node and its child node represents one of possible next actions. The child node of the root node represents the state after the action represented by its parent edge is taken. Then, MCTS repeatedly expands the search tree by repeatedly performing a set of 1) a selection step, 2) an expansion step, 3) a rollout step, and 4) a backpropagation step to evaluate the each of the possible next actions.

The selection step is a step to select a node to be expanded (in other words, a node to which a new child node is appended). The expansion step is a step to generate and append a new child node to the selected node. The rollout step is a step to execute a random rollout from the new child node. The backpropagation step is a step to assign an evaluation score to the new child node and update the evaluation scores of the ancestors of the new child node based on the result of the rollout.

In the case of the pathfinding apparatus 2000, each candidate path set of the target time window describes a possible set of actions of the vehicles 20 for next time window, and can be handles as a possible action for the next step in the context of MCTS. Thus, the evaluation unit 2080 evaluates the multiple candidate path sets by performing MCTS with a search tree that represents a problem of "which one of candidate path sets is to be selected as the path plan 40 for the next time window". It is noted that the actions of the vehicle 20 and the moving obstacle may include wait and possible movements (e.g., move up, down, left, and right in a 2D grid map). Hereinafter, the vehicle 20 and the moving obstacle are collectively called "entity".

Figure 5:
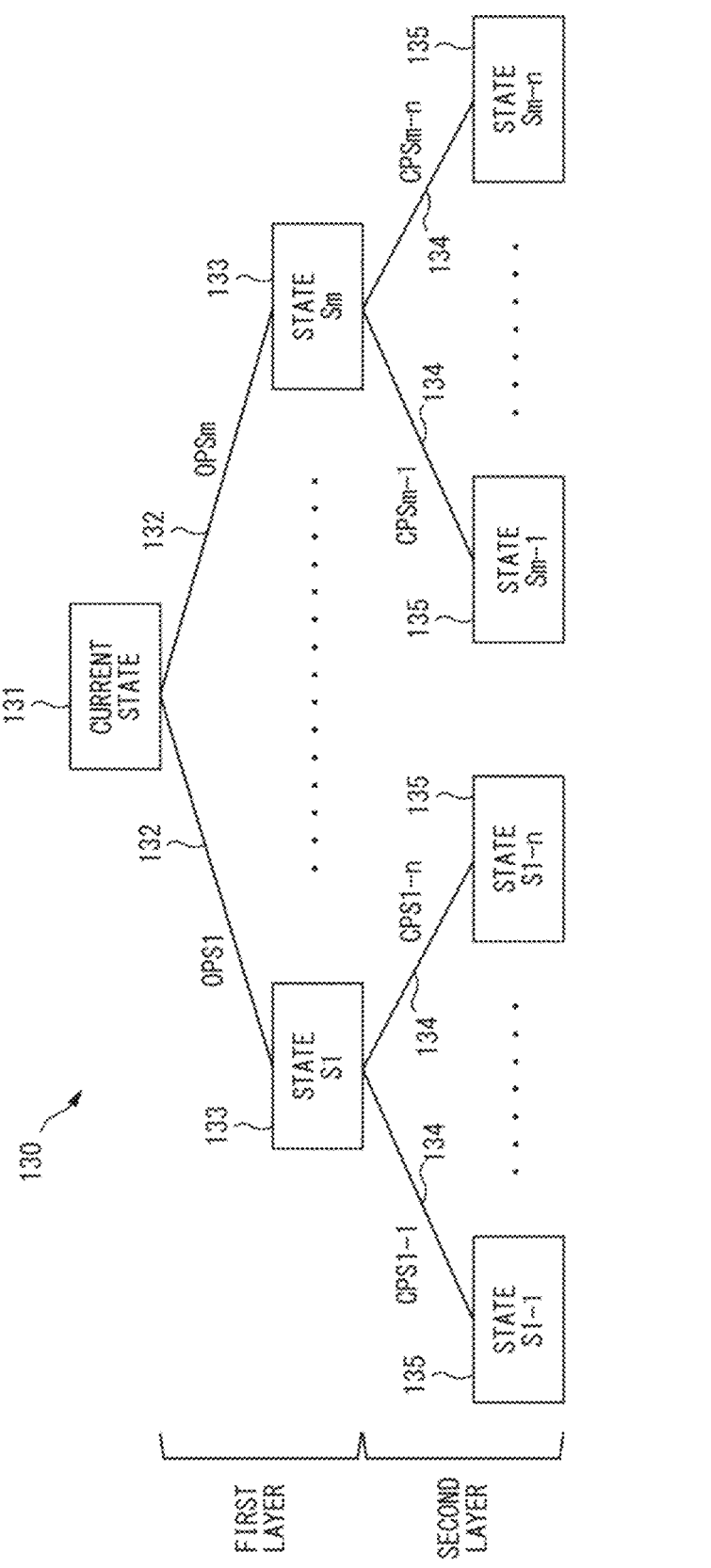
FIG. 5 illustrates an initial state of the search tree of MCTS employed in the evaluation unit.

FIG. 5 illustrates an initial state of the search tree of MCTS employed in the evaluation unit 2080. The search tree 130 includes a root node 131, edges 132, nodes 133, edges 134, and nodes 135. The root node 131 represents the current state that can be defined by the vehicle information 60 and the obstacle information 80.

The search tree 130 in the initial state is divided into two layers: the first layer represents the selection of the obstacle path sets whereas the second layer represents the selection of the candidate path set. The edge 132 represents possible sets of actions taken by the moving obstacles during the target time window, which are equivalent to the obstacle path sets of the target time window. In FIG. 5, an i-th obstacle path set is denoted by OPSi. The node 133 represents the state after the actions represented by the parent edge 132 are taken. The state after actions represented by the obstacle path set OPSi is taken is denoted by Si in FIG. 5.

The edge 134 represents possible sets of actions taken by the vehicles 20 during the target time window, which are equivalent to the candidate path sets of the target time window. In FIG. 5, an j-th candidate path set below the i-th obstacle path set is denoted by CPSi-j. The node 135 represents the state after the actions represented by the parent edge 134 are taken. The state after actions represented by the candidate path set CPSi-j is taken is denoted by Si-j in FIG. 5.

After initializing the search tree 130, the evaluation unit 2080 heuristically searches various patterns of future actions of the entities by expanding the search tree 130 from the nodes 135, and computes an evaluation score (e.g., Upper Confidence Tree (UCT)) for each node of the search tree to evaluates each pattern of actions. Hereinafter, two example ways to evaluate the candidate path set through MCTS will be explained.

<<First Example of MCTS>>

Figure 6:
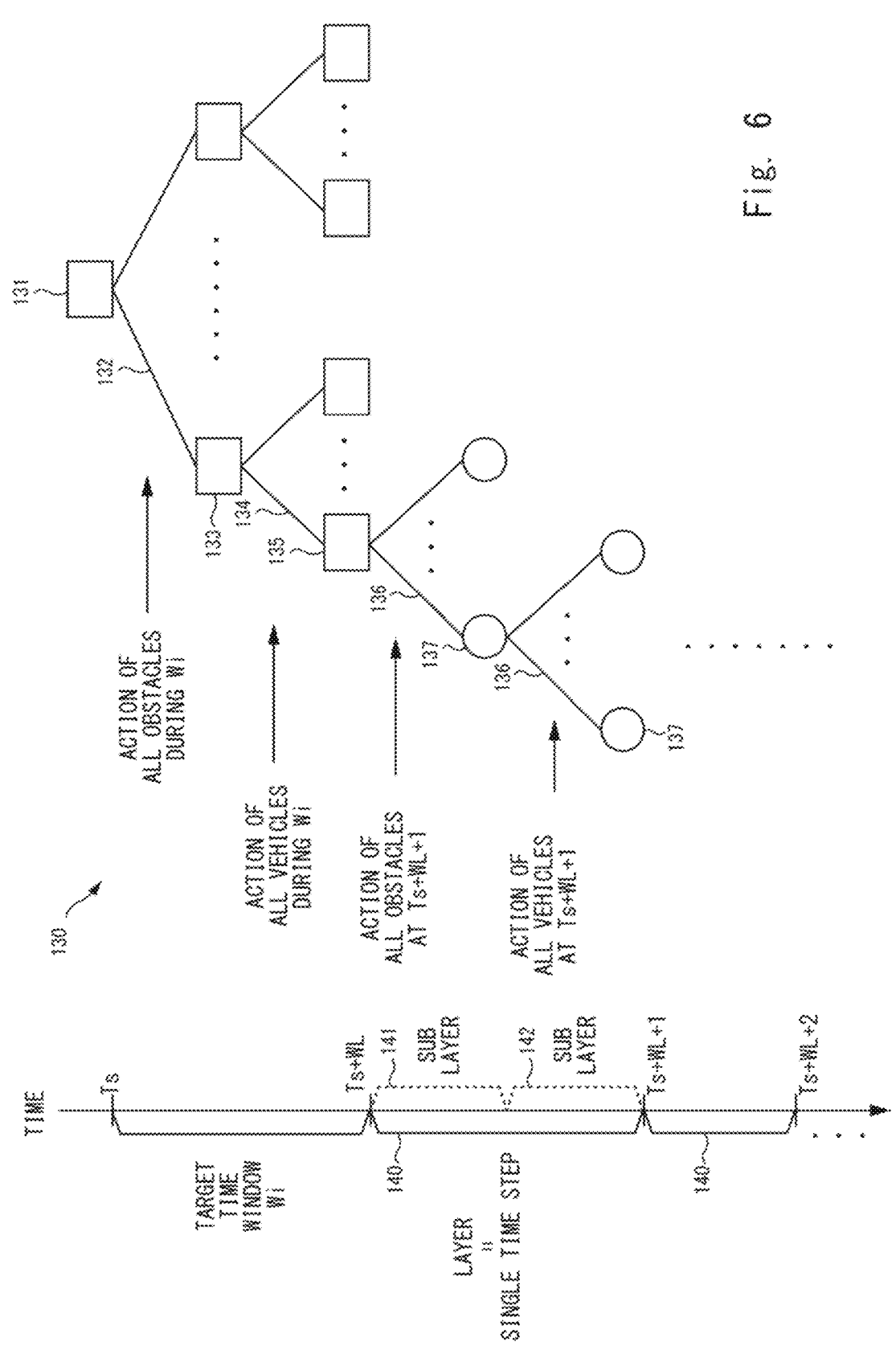
FIG. 6 illustrates a search tree of the first example of MCTS employed in the evaluation unit.

FIG. 6 illustrates a search tree of the first example of MCTS employed in the evaluation unit 2080. In this example, the start time of the target time window and the length of the time window is denoted by Ts and WL, respectively. The search tree 130 is expanded by appending an edge 136 that represents a set of actions of all moving obstacles or all vehicles 20 at a single time step. To clarify this feature, in FIG. 6, the search tree 130 is divided into layers 140 each of which corresponds to a single time step. In addition, the layer 140 is divided into two sub layers 141 and 142. The edge 136 in the sub layer 141 represents a set of actions taken by all moving obstacles at the corresponding time step whereas the edge 136 in the sub layer 142 represents a set of actions taken by all vehicles 20 at the corresponding time step. It is noted that the order of the sub layers 141 and 142 may be interchangeable. The node 137 represents the state after the action represented by its parent edge 136 is taken.

As mentioned above, MCTS repeatedly performs a set of the selection step, expansion step, rollout step, and back-propagation step. In the selection step of the first example of MCTS, the nodes are selected based on the evaluation score. Specifically, starting from the root node, the evaluation unit 2080 selects successive child nodes until it reaches a leaf node of the search tree 130, and handles the selected leaf node as the node to be expanded. At each level of the search tree 130, the evaluation unit 2080 selects the node with the largest evaluation score.

It is noted that, as to the first execution of the selection step, the node to be expanded may be selected without the evaluation score. For example, the evaluation unit 2080 may randomly select one of the nodes 135. In another example, the node 135 that is generated from the solution with the largest score in the variant CBS may be selected as the node to be expanded.

In the expansion step, the evaluation unit 2080 generates a new edge 136 and a new node 137 and appends them to the node to be expanded. In the case where the new edge 136 is generated for a sub layer 141, the evaluation unit 2080 generates the new edge 136 that represents a set of actions of all moving obstacles. On the other hand, in the case where the new edge 136 is generated for a sub layer 142, the evaluation unit 2080 generates the new edge 136 that represents a set of actions of all vehicles 20.

The evaluation unit 2080 generates a set of actions to be assigned to the new edge 136 by determining a type of action for each entity (i.e., for each moving obstacle or for each vehicle 20). The type of action may be randomly selected from the possible actions for each entity. However, a set of actions assigned to the new edge 136 have to be different from any sets of actions that have been already assigned to its sibling edges, i.e., the edges 136 that shares the parent node with the new edge 136. The possible actions can be determined based on the location of the entity that is indicated by the node to be expanded and the map shown by the map information 70. In the case where the possible actions depend on the type of the entity, the type of the entity for which the new edge 136 is generated is also taken into consideration to determine the possible actions.

The evaluation unit 2080 generates a new node 137 based on the state represented by its parent node (i.e., the node to be expanded) and the actions represented by the new edge 136. Specifically, the state to be represented by the node 137 may be generated by changing the locations of the entities from those indicated by the parent node according to the actions represented by the new edge 136.

In the rollout step, the evaluation unit 2080 performs a random rollout from the new node 137 until the travels of all vehicles 20 end. It is noted that the travels of all vehicles 20 may end when all vehicles 20 reach their goal or when a deadlock occurs. In the rollout, the evaluation unit 2080 may repeatedly perform a random selection of an action from the possible ones for each entity in turn.

In the backpropagation step, the evaluation unit 2080 assigns the evaluation score to the new node 137 and updates the evaluation score of each ancestor (including the nodes 133 and 135) of the new node 137. In the pathfinding apparatus 2000, the evaluation score may be defined to represent how suitable the set of the vehicle paths is to control the vehicles 20.

The evaluation score may be defined to reflect the cost of the set of the vehicle paths, such as makespan or total time.

The makespan of a set of the paths is the time required for all vehicles 20 reaching their goal (in other words, the length of the longest vehicle path of all). On the other hand, the total time of a set of the paths is the sum of the time required for each vehicle 20 reaching its goal (in other words, the total length of the vehicle paths of all vehicles 20). In addition, the evaluation score may also be defined to reflect occurrence of the conflicts and a deadlock.

In some embodiments, the evaluation score is defined as a variant of UCT as follows:

Equation 1

$$UCT_i = \frac{Q_i}{n_i} + c\sqrt{\frac{2\log N_i}{n_i}} \tag{1}$$

wherein i represents the index of the node; UCT_i represents the UCT of the node with the index i (denoted by "node i", hereinafter); Q_i represents a sum of rewards for the rollout from the node i; n_i represents the number of the rollouts that have been performed from the node i or its descendants; c represents a weight of the second term; and N_i represents the total number of rollouts that have been performed from the parent of the node n_i.

The reward may be defined to reflect the factors mentioned above: e.g., cost, conflict, and deadlock. Specifically, the reward may be defined to become larger as the cost becomes smaller. The reward may be defined to become smaller as the number of conflicts becomes larger. The reward in the case where a deadlock occurs may be defined to be smaller than that in the case where a deadlock does not occur.

MCTS repeatedly performs the set of the selection step to the backpropagation step until a predefined termination condition is satisfied. Then, as the result of the evaluation with MCTS, the evaluation unit 2080 obtains the evaluation scores of the nodes 135, each of which corresponds to one of the candidate path sets.

There may be various well-known conditions to terminate MCTS, and one or more of those conditions can be employed to the first example of MCTS performed by the evaluation unit 2080. For example, the termination condition may be "executing the set of the steps predefined times" or "a period of time with a predefined length expires after starting executing MCTS".

<<Second Example of MCTS>>

Figure 7:
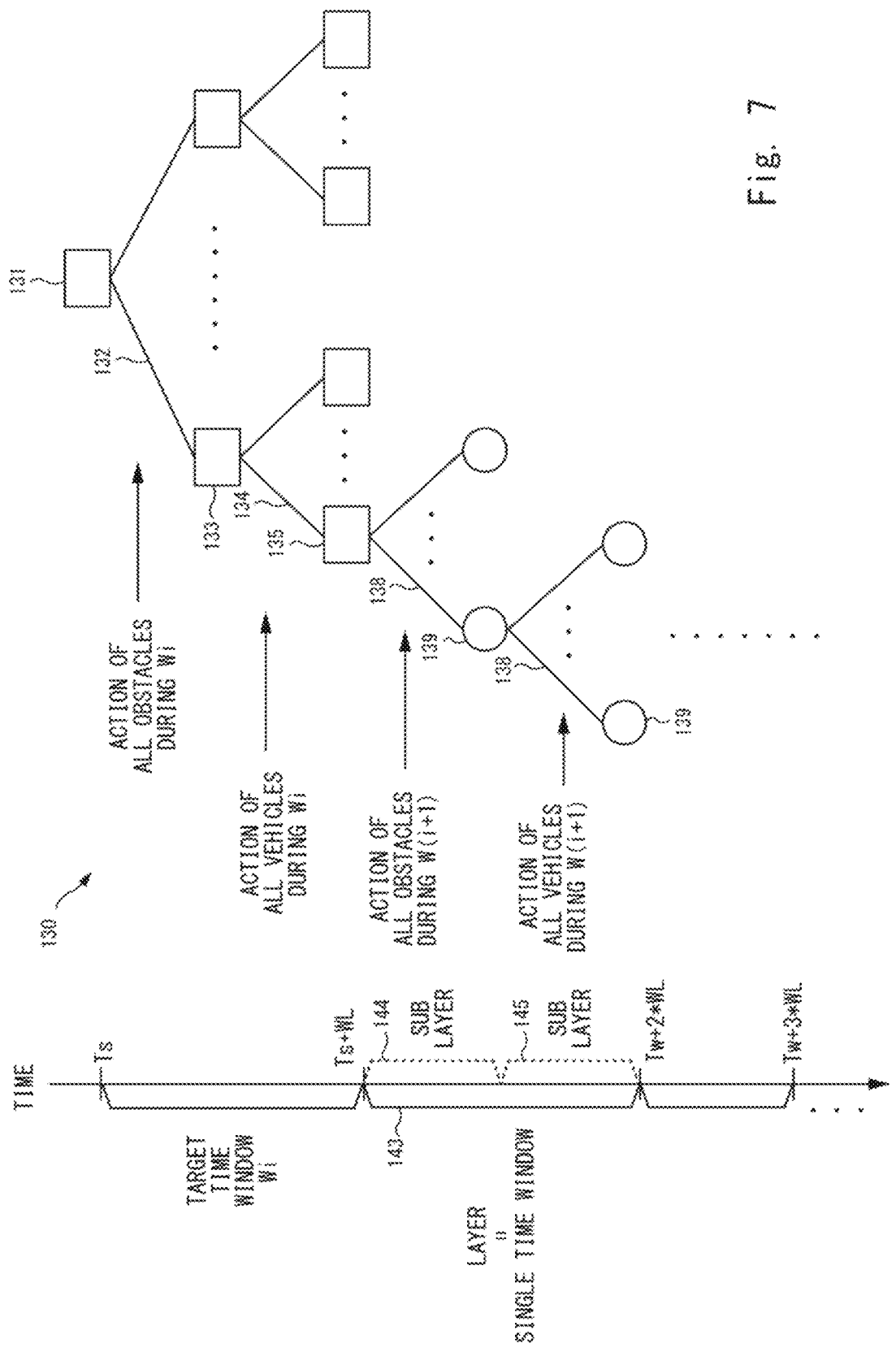
FIG. 7 illustrates a search tree of the second example of MCTS employed in the evaluation unit.

FIG. 7 illustrates a search tree of the second example of MCTS employed in the evaluation unit 2080. This algorithm is different from the first example of MCTS in a unit of expansion in the expansion step. The unit of expansion in the first example of MCTS is "a single action of all moving obstacles or all vehicles 20 at a single time step". Thus, it is a set of actions of all moving obstacles or all vehicles 20 at a single time step that each edge 136 added in the expansion step represents. On the other hand, the unit of expansion in the second example of MCTS is "a set of actions of all moving obstacles or all vehicles 20 during a time window". Thus, it is a set of actions of all moving obstacles or all vehicles 20 during a time window that each edge 138 added in the expansion step represents. It is noted that, to distinguish the search tree 130 of the second example of MCTS and that of the first example of MCTS, the edges and nodes added below the node 135 in the search tree 130 of the second example of MCTS are denoted by "edges 138" and "nodes 139", respectively.

The search tree 130 of the second example of MCTS includes multiple layers 143, each of which corresponds to a single time window. In addition, the layer 143 is divided into two sub layers 144 and 145. The edge 138 in the sub layer 144 represents a set of actions taken by all moving obstacles at the corresponding time window whereas the edge 138 in the sub layer 145 represents a set of actions taken by all vehicles 20 at the corresponding time window.

As described later in detail, the set of actions represented by the edge 138 in the sub layer 145 is determined so that the paths become conflict-free with each other. Thus, according to the second example of MCTS, it is possible to search various patterns of paths that are guaranteed to be conflict-free during a period of time longer than a single time window. On the other hand, according to the first example of MCTS, it is possible to search various patterns of paths with less computation time than the second example of MCTS.

Hereinafter, each of the selection step to the backpropagation step performed by the second example of MCTS will be explained in detail. For ease of explanation, the expansion step is explained before the selection step.

In the expansion step, the second example of MCTS expands the search tree 130 by appending a new edge 138 and a new node 139 to the leaf node selected in the selection step. In order to generate the new edge 138, the evaluation unit 2080 determines a set of actions of all moving obstacles or all vehicles 20 during a time window (called "expanded time window", hereinafter) following to the time window that corresponds to the leaf node selected in the selection step.

The evaluation unit 2080 determines a set of actions of all moving obstacles for the expanded time window in a way similar to the way that the prediction unit 2040 generates the obstacles path sets for the target time window. Specifically, when adding the new edge 138 to the sub layer 144, the evaluation unit 2080 may generate a set of actions of all moving obstacles using the obstacle simulator mentioned above. The history of the locations of the moving obstacles is represented by the node to be expanded and its ancestors.

The evaluation unit 2080 determines a set of actions of all vehicle 20 for the expanded time window in a way similar to the way that the candidate generation unit 2060 generates the candidate path sets for the target time window. Specifically, when adding the new edge 138 to the sub layer 145, the evaluation unit 2080 may generate a set of actions of all vehicles 20 with the variant CBS mentioned above. The current locations of the vehicles 20 are represented by the node to be expanded. The obstacle path set is represented by the parent edge of the node to be expanded. Hereinafter, a set of paths of vehicles 20 that is generated by the evaluation unit 2080 is called "vehicle path set" to distinguish it from the candidate path set.

It is noted that, as mentioned above, the variant CBS generates multiple vehicle path sets. Thus, the evaluation unit 2080 selects one of the vehicle path sets generated by the variant CBS and assigns it to the new edge 138. The other vehicle path sets are retained in association with the node to be expanded for future use. Specifically, in the selection step for the iteration in which the new node 138 is to be added to the sub layer 145, the evaluation unit 2080 determines whether or not there are vehicle path sets that are associated with the node to be expanded and not assigned yet to a new edge 138.

In the case where there are vehicle path sets that are not assigned yet to a new edge 138, the evaluation unit 2080 selects the node that is associated with those vehicle path sets as one to be expanded in the selection step, and selects one of those vehicle path sets and generates the new node 138 that represents the selected vehicle path set in the expansion step. Otherwise, the evaluation unit 2080 selects the leaf node to be expanded based on the evaluation score of the nodes in the selection step.

Also, when the new edge 138 is to be added to the sub layer 144, the evaluation unit 2080 selects the leaf node to be expanded based on the evaluation score of the nodes in the selection step.

After generating the new edge 138, the evaluation unit 2080 generates the new node 139 and appends the new edge 138 and the new node 139 to the node to be expanded. The new node 139 may be generated in the same way as the way to generate the new node 137.

As to the rollout step and the backpropagation step, the second example of MCTS works in the same manner as the first example of MCTS. Specifically, in the rollout step, the second example of MCTS performs a random rollout from the new node 139 in which an action of each entity is randomly selected in turn until the rollout reaches its end. Then, in the backpropagation step, the second example of MCTS assigns an evaluation score to the new node 139 and updates the evaluations scores of the ancestors of the new node 139. The definition of the evaluation score in the second example of MCTS may be the same as that in the first example of MCTS.

The second example of MCTS repeatedly performs a set of the selection step to the backpropagation step until the predefined condition is satisfied. This predefined condition may be the same as that employed in the first example of MCTS.

<Output of Path Plan 40: S114>

The output unit 2100 selects one of the candidate path sets based on their evaluations, and outputs the selected one as the path plan 40 for the target time window (S114). In some embodiments, from the search tree 130 of MCTS, the output unit 2100 selects the node 135 whose evaluation score is largest of all nodes 135. Then, the output unit 2100 selects the candidate path set that corresponds to the parent edge 134 of the selected node 135 as one to be output (i.e., one to be employed as the path plan 40 of the target time window). The output unit 2100 outputs information, called output information, that indicates the candidate path set selected as the path plan 40.

The output information may be output in various manners. For example, the output unit 2100 may put the output information into a storage device. In another example, the output unit 2100 may send the output information to another computer, such as one that distributes the vehicle path indicated by the path plan 40 to each vehicle 20. In another example, the output unit 2100 may output the output information to a display device so that the path plan 40 is displayed on the display device.

Although the present disclosure is explained above with reference to example embodiments, the present disclosure is not limited to the above-described example embodiments. Various modifications that can be understood by those skilled in the art can be made to the configuration and details of the present disclosure within the scope of the invention.

The programs mentioned in this disclosure include instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

This application is based upon and claims the benefit of priority from Japanese patent application No. 2022-003872, filed on Jan. 13, 2022, the disclosure of which is incorporated herein in its entirety by reference.

REFERENCE SIGNS LIST

20 vehicle
40 path plan
50 path
60 vehicle information
70 map information
80 obstacle information
130 search tree
131 root node
132 edge
133 node
134 edge
135 node
136 edge
137 node
138 edge
139 node
140 layer
141 sub layer
142 sub layer
143 layer
144 sub layer
145 sub layer
1000 computer
1020 bus
1040 processor
1060 memory
1080 storage device
1100 input/output interface
1120 network interface
2000 pathfinding apparatus
2020 acquisition unit
2040 prediction unit
2060 candidate generation unit
2080 evaluation unit
2100 output unit

The invention claimed is:

1. A pathfinding apparatus comprising:
at least one processor; and
memory storing instructions;
wherein the at least one processor is configured to execute the instructions to:
acquire vehicle information, obstacle information, and map information, the vehicle information including a current location and a goal location for each of multiple vehicles, the obstacle information including history of locations of one or more moving obstacles, the map information including a map of a space in which the vehicles and the moving obstacles travel;

generate one or more obstacle paths for each moving obstacle during a target time window of a predefined length based on the obstacle information and the map information;

generate, for each of the multiple vehicles, multiple candidate path sets based on the vehicle information, the obstacle paths, and the map information, the candidate path set including a vehicle path during the target time window for each vehicle, the vehicle path being conflict-free with the other vehicle paths and the obstacle paths;

evaluate the candidate path sets through a heuristic search of continuations of the vehicle paths in the candidate path sets; and for each of the multiple vehicles, select one of the candidate path sets corresponding to the vehicle based on their evaluations and output the selected candidate path set to the vehicle, wherein the candidate path sets are evaluated by executing a Monte Carlo Tree Search algorithm that includes:

generating a search tree whose root node has a child node for each candidate path set, the child node having a parent edge that represents a set of actions of the moving obstacles and the vehicles during the target time window that are represented by the candidate path set and the obstacle paths; and repeatedly executing a set comprising a selection operation, an expansion operation, a rollout operation, and a backpropagations operation, wherein, in the selection operation, a node to be expanded is selected based on an evaluation score of each node, wherein, in the expansion operation, a pair of a new edge and a new node is generated and appended to the node to be expanded, the new edge representing one or more actions for one or more of the vehicles and the moving obstacles, wherein, in the rollout operation, a rollout is performed to generate continuations of paths of the vehicles and the moving obstacles until all vehicles reach their goal or until a deadlock occurs, wherein, in the backpropagation operation, the evaluation score is computed for the node to be expanded and ancestors thereof based on a result of the rollout, and wherein at least one of the multiple vehicles is an autonomous vehicle.

2. The pathfinding apparatus according to claim 1, wherein the generation of the candidate path sets includes performing a variant of Conflict-based Search algorithm, and wherein the variant of Conflict-based Search algorithm includes:

generating, based on the obstacle paths, constraints to avoid conflicts between the vehicle and the moving obstacle, and adding the generated constraints to a root node of a conflict tree;

resolving conflicts during the target time window; and outputting two or more solutions to generate the multiple candidate path sets.

3. The pathfinding apparatus according to claim 1, wherein the new edge represents an action at a time step for the vehicle or the moving obstacle, and wherein the new edge is generated for each vehicle and moving obstacle in turn in the repetitive execution of the expansion operation.

4. The pathfinding apparatus according to claim 1, wherein the new edge represents a set of actions of the vehicles and the moving obstacles during a time window.

5. The pathfinding apparatus according to claim 1, wherein the evaluation score is computed based on: a cost of the paths of the vehicles obtained as a result of the rollout; a number of conflicts that happened in the rollout; and whether or not a deadlock happened in the rollout; or two or more thereof.

6. A pathfinding method performed by a computer, the pathfinding method comprising:

acquiring vehicle information, obstacle information, and map information, the vehicle information including a current location and a goal location for each of multiple vehicles, the obstacle information including history of locations of one or more moving obstacles, the map information including a map of a space in which the vehicles and the moving obstacles travel;

generating one or more obstacle paths for each moving obstacle during a target time window of a predefined length based on the obstacle information and the map information;

generating, for each of the multiple vehicles, multiple candidate path sets based on the vehicle information, the obstacle paths, and the map information, the candidate path set including a vehicle path during the target time window for each vehicle, the vehicle path being conflict-free with the other vehicle paths and the obstacle paths;

evaluating the candidate path sets through a heuristic search of continuations of the vehicle paths in the candidate path sets; and for each of the multiple vehicles, selecting one of the candidate path sets corresponding to the vehicle based on their evaluations and output the selected candidate path set to the vehicle, wherein the candidate path sets are evaluated by executing a Monte Carlo Tree Search algorithm that includes:

generating a search tree whose root node has a child node for each candidate path set, the child node having a parent edge that represents a set of actions of the moving obstacles and the vehicles during the target time window that are represented by the candidate path set and the obstacle paths; and repeatedly executing a set comprising a selection operation, an expansion operation, a rollout operation, and a backpropagations operation, wherein, in the selection operation, a node to be expanded is selected based on an evaluation score of each node, wherein, in the expansion operation, a pair of a new edge and a new node is generated and appended to the node to be expanded, the new edge representing one or more actions for one or more of the vehicles and the moving obstacles, wherein, in the rollout operation, a rollout is performed to generate continuations of paths of the vehicles and the moving obstacles until all vehicles reach their goal or until a deadlock occurs, wherein, in the backpropagation operation, the evaluation score is computed for the node to be expanded and ancestors thereof based on a result of the rollout, and wherein at least one of the multiple vehicles is an autonomous vehicle.

7. The pathfinding method according to claim 6, wherein the generation of the candidate path sets includes performing a variant of Conflict-based Search algorithm, and wherein the variant of Conflict-based Search algorithm includes:

generating, based on the obstacle paths, constraints to avoid conflicts between the vehicle and the moving obstacle, and adding the generated constraints to a root node of a conflict tree;

resolving conflicts during the target time window; and outputting two or more solutions to generate the multiple candidate path sets.

8. The pathfinding method according to claim 6, wherein the new edge represents an action at a time step for the vehicle or the moving obstacle, and wherein the new edge is generated for each vehicle and moving obstacle in turn in the repetitive execution of the expansion operation.

9. The pathfinding method according to claim 6, wherein the new edge represents a set of actions of the vehicles and the moving obstacles during a time window.

10. The pathfinding method according to claim 6, wherein the evaluation score is computed based on: a cost of the paths of the vehicles obtained as a result of the rollout; a number of conflicts that happened in the rollout; and whether or not a deadlock happened in the rollout; or two or more thereof.

11. A non-transitory computer-readable storage medium storing a program that causes a computer to execute:

acquiring vehicle information, obstacle information, and map information, the vehicle information including a current location and a goal location for each of multiple vehicles, the obstacle information including history of locations of one or more moving obstacles, the map information including a map of a space in which the vehicles and the moving obstacles travel;

generating one or more obstacle path for each moving obstacle during a target time window of a predefined length based on the obstacle information and the map information;

generating, for each of the multiple vehicles, multiple candidate path sets based on the vehicle information, the obstacle paths, and the map information, the candidate path set including a vehicle path during the target time window for each vehicle, the vehicle path being conflict-free with the other vehicle paths and the obstacle paths;

evaluating the candidate path sets through a heuristic search of continuations of the vehicle paths in the candidate path sets; and for each of the multiple vehicles, selecting one of the candidate path sets corresponding to the vehicle based on their evaluations and output the selected candidate path set to the vehicle, wherein the candidate path sets are evaluated by executing a Monte Carlo Tree Search algorithm that includes:

generating a search tree whose root node has a child node for each candidate path set, the child node having a parent edge that represents a set of actions of the moving obstacles and the vehicles during the target time window that are represented by the candidate path set and the obstacle paths; and repeatedly executing a set comprising a selection operation, an expansion operation, a rollout operation, and a backpropagations operation, wherein, in the selection operation, a node to be expanded is selected based on an evaluation score of each node, wherein, in the expansion operation, a pair of a new edge and a new node is generated and appended to the node to be expanded, the new edge representing one or more actions for one or more of the vehicles and the moving obstacles, wherein, in the rollout operation, a rollout is performed to generate continuations of paths of the vehicles and the moving obstacles until all vehicles reach their goal or until a deadlock occurs, and wherein, in the backpropagation operation, the evaluation score is computed for the node to be expanded and ancestors thereof based on a result of the rollout, and wherein at least one of the multiple vehicles is an autonomous vehicle.

12. The storage medium according to claim 11, wherein the generation of the candidate path sets includes performing a variant of Conflict-based Search algorithm, and wherein the variant of Conflict-based Search algorithm includes:

generating, based on the obstacle paths, constraints to avoid conflicts between the vehicle and the moving obstacle, and adding the generated constraints to a root node of a conflict tree;

resolving conflicts during the target time window; and outputting two or more solutions to generate the multiple candidate path sets.

13. The storage medium according to claim 11, wherein the new edge represents an action at a time step for the vehicle or the moving obstacle, and wherein the new edge is generated for each vehicle and moving obstacle in turn in the repetitive execution of the expansion operation.

14. The storage medium according to claim 11, wherein the new edge represents a set of actions of the vehicles and the moving obstacles during a time window.

15. The storage medium according to claim 11, wherein the evaluation score is computed based on: a cost of the paths of the vehicles obtained as a result of the rollout; a number of conflicts happened that in the rollout; and whether or not a deadlock happened in the rollout; or two or more thereof.

\* \* \* \* \*